(12) United States Patent
Pugliese

(10) Patent No.: US 8,787,918 B2
(45) Date of Patent: Jul. 22, 2014

(54) TRANSMITTING DATA OVER A MOBILE TELECOMMUNICATION NETWORK

(75) Inventor: Pierluigi Pugliese, Munich (DE)

(73) Assignee: LSI Corporation, Milpitas, CA (US)

( * ) Notice: Subject to any disclaimer, the term of this patent is extended or adjusted under 35 U.S.C. 154(b) by 611 days.

(21) Appl. No.: 12/675,842

(22) PCT Filed: Aug. 28, 2007

(86) PCT No.: PCT/EP2007/058915
§ 371 (c)(1),
(2), (4) Date: Aug. 13, 2010

(87) PCT Pub. No.: WO2009/026955
PCT Pub. Date: Mar. 5, 2009

(65) Prior Publication Data
US 2010/0304711 A1 Dec. 2, 2010

(51) Int. Cl.
H04W 40/00 (2009.01)
H04L 12/14 (2006.01)
H04L 12/58 (2006.01)
H04L 29/06 (2006.01)

(52) U.S. Cl.
CPC ............ H04L 12/14 (2013.01); H04L 12/1485 (2013.01); H04L 51/38 (2013.01); H04L 12/5895 (2013.01); H04L 12/5835 (2013.01); H04L 12/1492 (2013.01); H04L 51/066 (2013.01); H04L 69/04 (2013.01)
USPC ........................................................ 455/445

(58) Field of Classification Search
USPC .............. 455/405–408, 432.2, 445, 450–455, 455/464, 466, 550.1, 552.1, 553.1, 515, 455/516, 556.1, 556.2, 127.4; 370/229–238, 310.2, 322, 326, 328, 370/335–338, 342–345, 348, 351–356, 370/437–439, 465–480; 709/201–253; 725/1–21
See application file for complete search history.

(56) References Cited

U.S. PATENT DOCUMENTS

| | | | |
|---|---|---|---|
| 6,671,285 B1 * | 12/2003 | Kirkby et al. | 370/468 |
| 6,760,303 B1 * | 7/2004 | Brouwer | 370/229 |
| 6,816,726 B2 * | 11/2004 | Lysejko et al. | 455/414.1 |
| 6,934,530 B2 * | 8/2005 | Engelhart | 455/406 |
| 2003/0012217 A1 * | 1/2003 | Andersson et al. | 370/437 |
| 2006/0026004 A1 * | 2/2006 | Van Nieuwenhuizen | 705/1 |
| 2006/0078064 A1 | 4/2006 | Schmidt et al. | |
| 2007/0019551 A1 * | 1/2007 | Pozhenko et al. | 370/235 |

FOREIGN PATENT DOCUMENTS

| | | | |
|---|---|---|---|
| EP | 1298933 A2 | 4/2003 | |
| GB | 2397201 A | 7/2004 | |
| JP | 11068825 A | 3/1999 | |
| WO | 2006010373 A1 | 2/2006 | |
| WO | 2009026955 A1 | 3/2009 | |

* cited by examiner

Primary Examiner — San Htun

(57) ABSTRACT

A network is configured to charge fees at a first rate for transmitting data of a first type and fees at a second, less expensive, rate for transmitting data of a second type. In a first embodiment, at least a portion of the original data transmitted is converted from the first type into the second type before sending the processed data to the network. A corresponding conversion from the second type into the first type is performed at the receiver's side to obtain re-created data from the received data. In a second embodiment, the original data is processed to obtain at least a first portion of data having the first type and a second portion of data having the second type. The at least two portions are sent to the network via different channels ensuring that at least the second portion will be billed at the second, lower rate.

24 Claims, 3 Drawing Sheets

TRANSMITTING DATA OVER A MOBILE TELECOMMUNICATION NETWORK

CROSS-REFERENCE TO RELATED APPLICATION

Figure 1:
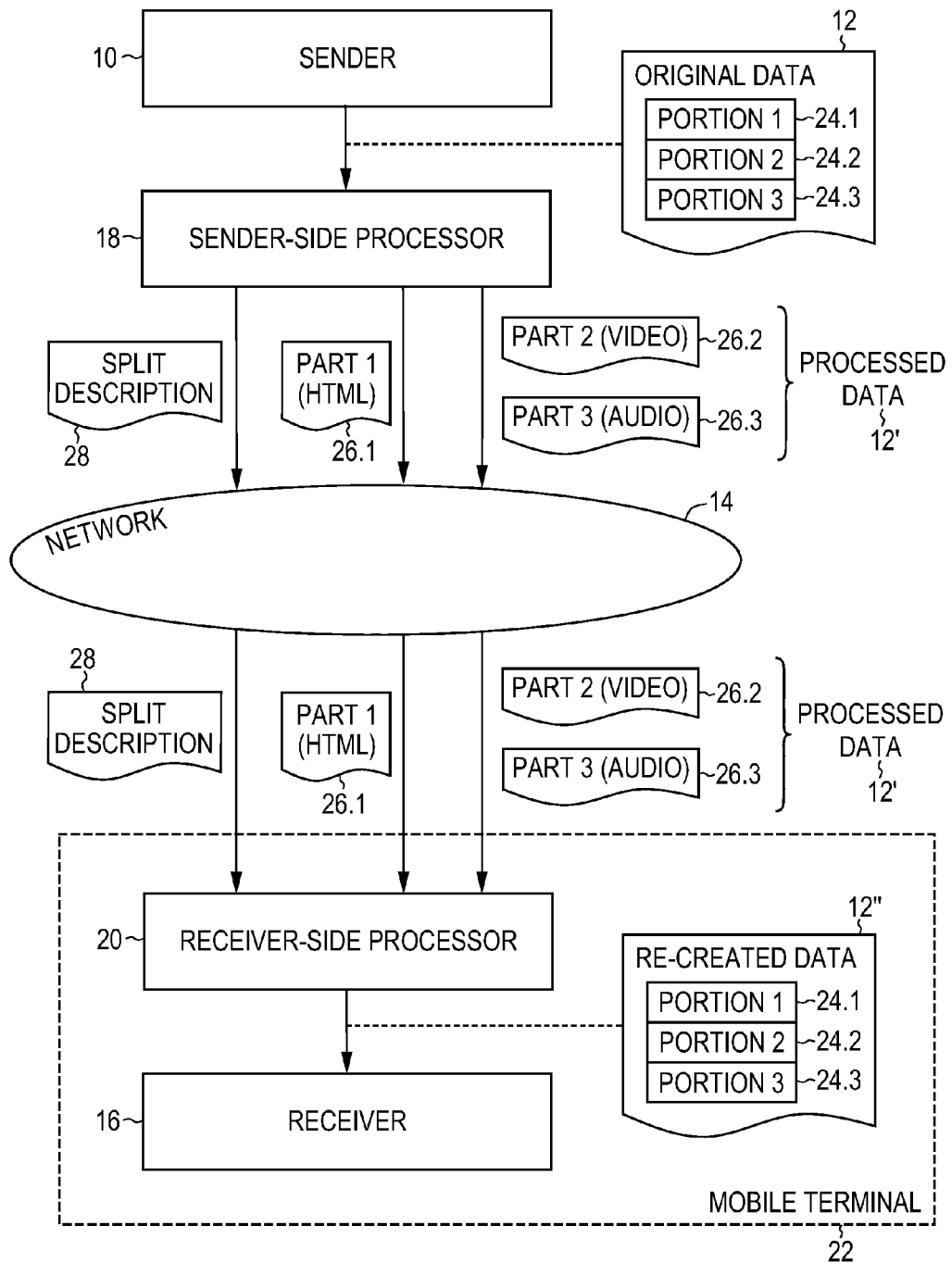

This application is the National Stage of, and therefore claims the benefit of International Application No. PCT/EP2007/058915, filed on Aug. 28, 2007, entitled "Transmitting Data Over A Mobile Telecommunication Network," which was published in English under International Publication Number WO 2009/026955 on Mar. 5, 2009. The above application is commonly assigned with this National Stage application and incorporated herein by reference in its entirety.

TECHNICAL FIELD

The present invention relates to the field of transmitting data over a mobile telecommunication network. In the terminology used in the present document, a mobile telecommunication network is a network that includes at least one base station and enables wireless communication with at least one mobile terminal.

BACKGROUND

Mobile telecommunication networks have become ubiquitous. The general technical and commercial development has provided increased data transmission capabilities at lower costs, and consequently a variety of new applications—in addition to the original main application of mobile telephony—have become practicable. In particular, this includes Internet browsing, email services, and multimedia applications. As a non-limiting example, the IP Multimedia Subsystem (IMS) has been introduced as an approach for delivering Internet Protocol (IP) multimedia and other Internet services to mobile users.

The pricing plans for transferring data over mobile telecommunication networks are currently mostly time based, with volume based subscriptions starting to appear. However, the inventor anticipates that mobile network operators are likely to introduce fee plans in which the charges not only depend on the transmission time or volume, but also on the type of data that is transmitted. The purpose of such fee plans may be to retain the present level of revenue for traditional, low data volume applications while at the same time making high data volume applications economically attractive for the users. As an example, the price per byte of video download or WAP surfing may be set significantly cheaper than the price per byte for transmitting text like, e.g., an SMS.

SUMMARY

One aspect provides a it is an object of the present invention to enable data transmission over a telecommunication network at reduced costs.

The present invention is defined by the independent claims. The dependent claims concern optional features of some embodiments of the invention.

The present invention is based on the idea to make effective use of a charging policy in which a network operator charges fees at different rates for different types of data. For example, if a network operator charges fees at a first—more expensive—rate for transmitting data of a first type and fees at a second—less expensive—rate for transmitting data of a second type, then the present invention strives to have as much data as possible transmitted in the form of data of the second type instead of data of the first type.

According to a first aspect of the invention, at least a portion of the data to be transmitted is converted from the first type into the second type before sending the data to the network. A corresponding conversion from the second type into the first type is performed at the receiver's side to obtain re-created data from the received data. This technique reduces the costs for the data transmission since the network will charge the second, lower rate instead of the first, higher rate for transmitting the converted data portion.

In some embodiments, at least two different channels are used to send the first and one or more further portions of the data. A data type conversion may be performed for one, some or all of the one or more further data portions. However, it is also possible that one, some or all of the one or more further data portions are transmitted without any conversion.

In some embodiments, there is just a single portion of data that is identical or essentially identical to the entire data being transmitted.

According to a second aspect of the invention, the original data is processed to obtain at least a first portion of data having the first type and a second portion of data having the second type. The at least two portions are sent to the network via different channels to ensure that at least the second portion will be billed at the second, lower rate. Again, this technique reduces the costs for the data transmission as compared to transmitting the complete original data over the network at the first, higher rate.

In some embodiments, one or more or all data portions may be converted to the second type before sending the converted data portion(s) to the network. The received data is then converted back to the first type. A split description may be used in some embodiments to communicate information about the structure of the original data that may be required or at least useful for producing the re-created data.

The order of enumeration of the method steps in the claims is not to be construed as a limitation of the scope of protection. In particular, the present invention comprises embodiments in which the method steps are performed in another order or in a parallel or semi-parallel (interleaved) fashion.

The present invention also comprises a machine-readable medium having suitable program instructions. The machine-readable medium may be any kind of physical or non-physical data carrier like, for example, a computer disk or a CD-ROM or a semiconductor memory or a signal transmitted over a computer network.

BRIEF DESCRIPTION

Figure 2:
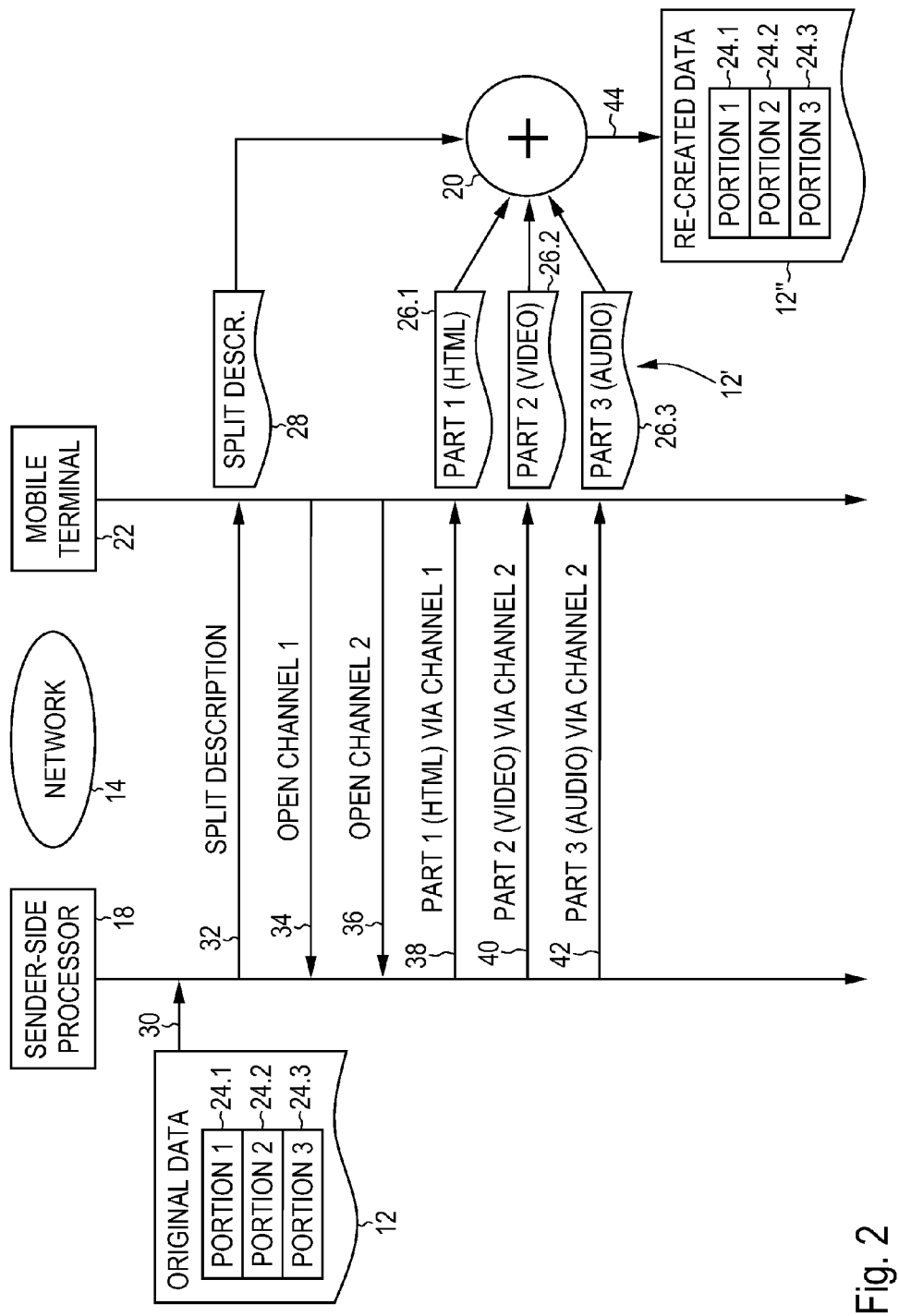
Figure 3:
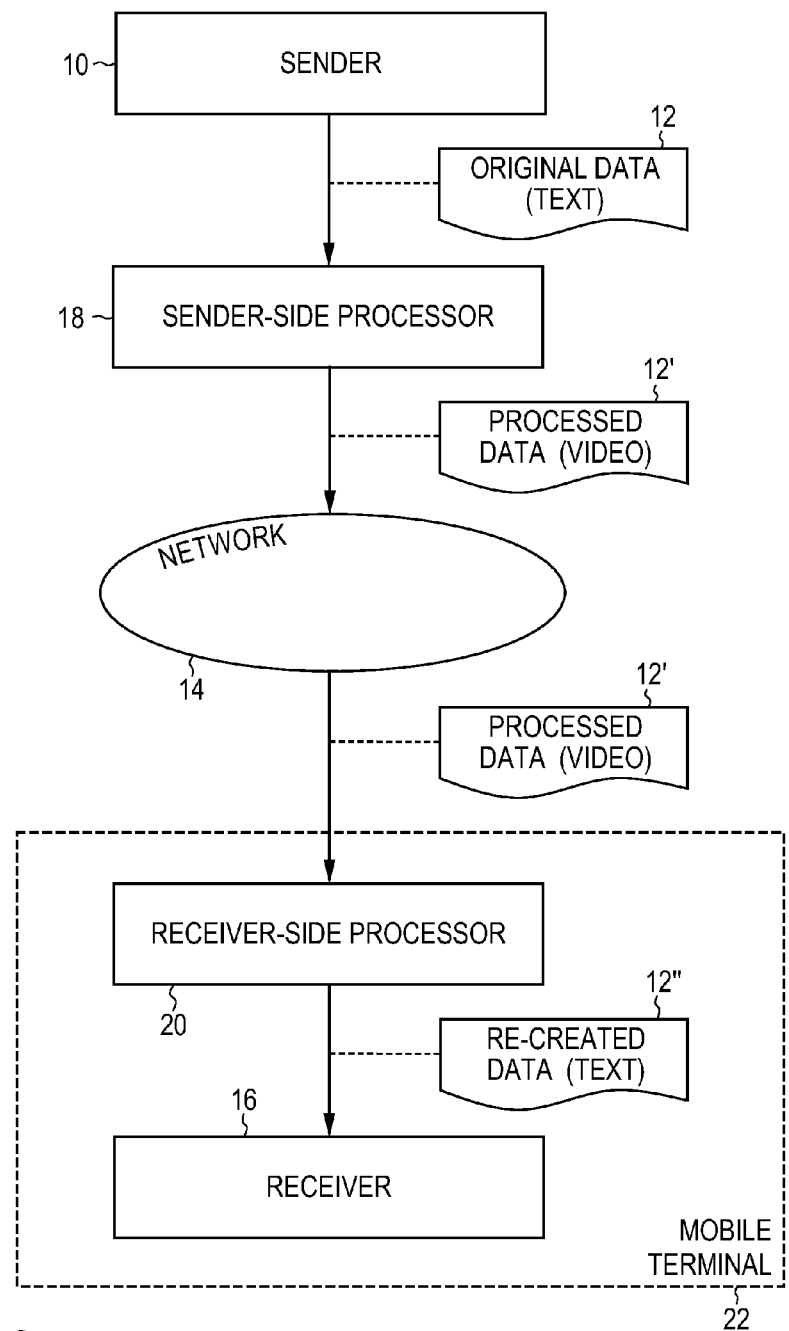

Reference is now made to the following descriptions taken in conjunction with the accompanying drawings, in which:

Further features, objects and advantages of the invention will become apparent from the following detailed description, in connection with the annexed schematic drawings, in which:

FIG. 1 shows a block diagram of a system according to an embodiment of the invention, FIG. 2 shows a time sequence diagram of a sample data transfer operation in the embodiment of FIG. 1, and FIG. 3 shows a block diagram of a system according to another embodiment of the invention.

DETAILED DESCRIPTION

FIG. 1 shows a sender 10 that sends data 12 over a mobile telecommunication network 14 to a receiver 16. In the sample embodiment depicted in FIG. 1, the original data 12 is an email message encoded in the MIME format, the sender 10 is an email server, and the receiver 16 is a receiving email program. However, the present invention is not limited to this particular configuration. The invention can generally be used for transmitting all kinds of data 12, including, without limitation, Web or WAP pages, multimedia data, documents, and so on, and the sender 10 and receiver 16 may be any software and/or hardware module or device that is adapted for sending and receiving this data 12, respectively.

The communication from the sender 10 to the network 14 runs via a sender-side processor 18, and the communication from the network 14 to the receiver 16 runs via a receiver-side processor 20. It is apparent that the representation of FIG. 1 is only a conceptual overview that may be implemented in a variety of different configurations. For example, the sender-side processor 18 may be a standalone device, or a software or hardware module that is associated with or integrated into the sender 10, or a software or hardware module that is associated with or integrated into the network 14. Likewise, the receiver-side processor 20 may be a standalone device, or a software or hardware module that is associated with or integrated into the receiver 16, or a software or hardware module that is associated with or integrated into the network 14. It is expected that many embodiments of the present invention will be implemented as software programs that are executed on servers or on mobile or stationary user devices.

In the embodiment shown in FIG. 1, a mobile terminal 22 comprises the receiver-side processor 20 and the receiver 16. For example, the mobile terminal 22 may be a mobile telephone or a personal digital assistant (PDA) or a computer equipped with a wireless communication module or another mobile device that is adapted to receive data from the network 14. It is apparent that the present invention is not limited to configurations in which the mobile part of the system is located at the side of the receiver 16. Instead, the invention is applicable to all systems in which the network 14 is a mobile telecommunication network, regardless of whether the sender 10 and/or the receiver 16 are stationary or mobile components. As a non-limiting example, the sender 10 may be a sending email program executed by a mobile terminal, and the receiver 16 may be a stationary email relay server that is connected to the network 14 by a fixed line.

In various embodiments, the network 14 may be any kind of mobile telecommunication network that provides services for data transmission. For example, the network 14 may conform to one or more of the GSM, GPRS, EDGE, CDMA, W-CDMA, UMTS and HSPA standards. The network 14 of the present embodiment implements the IP Multimedia Subsystem (IMS) framework, which is specified in various documents of the 3rd Generation Partnership Project (3GPP); these documents are available at http://www.3gpp.org. In accordance with the IMS framework, the network 14 of the present embodiment uses the Session Initiation Protocol (SIP) as a signaling protocol for creating, modifying and terminating sessions between participants. The SIP protocol is defined in RFC 3261 and other standards available at http://www.ietf.org. It is apparent that other multimedia frameworks and signaling protocols may be used in alternative embodiments.

The network 14 implements a charging policy in which the transmission of different types of data is charged to the subscriber at different fee rates. In the present embodiment, it is more costly to transmit a certain amount of text data than to transmit the same amount of video data, but it is apparent that the present invention may also be practiced with other fee structures.

In order to implement a data type dependent fee structure, the network 14 may provide different access point names or ports for each of the different types of data that are charged differently. Different PDP contexts (PDP=Packet Data Protocol, e.g., IP) are available at the corresponding access points. Alternatively, the network 14 may be sufficiently "intelligent" to analyze the traffic and automatically determine the type of data that is being transmitted. Traffic analyzing networks are already known in principle because some existing networks try to determine and block VoIP (Voice over IP) traffic. Traffic whose fee rate cannot be clearly determined—e.g., unspecified or "mixed" data traffic that comprises a plurality of data components having different types—will typically be charged by default at the normal—i.e., high-rate.

The method of the present invention can be used whenever the data 12 to be transmitted over the network 14 comprises, or can be separated into, a plurality of different portions. In the example shown in FIG. 1, the data 12 is a MIME message that comprises three different portions, namely a first portion 24.1 that has an HTML or text data type, a second portion 24.2 that has a video data type, and a third portion 24.3 that has an audio data type. Reference sign 24.x will be used in the following to designate all portions of the data 12 collectively.

As the data 12 is a MIME message and therefore pure text data, each portion 24.x is a piece of text that is an encoded representation of actual (native) data of the above data types; this actual data in its respective native formats will be designated as data parts 26.x in the following. In other words, the first portion 24.1 is a representation of a first data part 26.1 that has an HTML format, the second portion 24.2 is a text (7 bit) encoded representation of a second data part 26.2 that has a binary video format, and the third portion 24.3 is a text (7 bit) encoded representation of a third data part 26.3 that has a binary audio format.

The MIME (Multipurpose Internet Mail Extensions) message format is well-known. It is defined in standards RFC 2045, RFC 2046, RFC 2047, RFC 4288, RFC 4289 and RFC 2077, which are available from the Internet Engineering Task Force (IETF) at http://www.ietf.org. The MIME format was originally developed for encoding emails with attachments in various data formats into a single text message. Presently the MIME message format is widely employed in Internet related protocols like the SIP protocol that is used in the network 14 of the present sample embodiment.

A concrete example of a MIME message is given in the following Table 1:

TABLE 1

EXAMPLE OF MESSAGE IN MIME ENCODING

Content-type: multipart/mixed; boundary="frontier"
MIME-version: 1.0
This is a multi-part message in MIME format.
--frontier
Content-type: text/plain
This is the body of the message.
--frontier
Content-type: text/html; encoding=UTF-8
Content-transfer-encoding: base64
PGh0bWw+CiAgPGhlYWQ+CiAgPC9oZWFkPgogIDxib2R5PgogICAg
PHA+VGhpcyBpcyB0aGUgYm9keSBvZiB0aGUgbWVzc2FnZS48L3A+
CiAgPC9ib2R5Pgo8L2h0bWw+Cg==
--frontier--

The above MIME message encodes two data parts, namely a pure text part and an HTML part. These parts are delimited in the message by means of a boundary. Furthermore, as the above MIME message is based on a 7 bit character set, the binary UTF-8 data of the second data part is represented in encoded form. It is understood that the above MIME message is only intended as an example of the MIME format and not as a message that is likely to result in fee savings when being transmitted by the presently described embodiment. This is because the two data parts encoded in the above message are both text related and would therefore not be charged at different fee rates in a typical network 14.

The basic idea of the presently described embodiment is to split and convert the original data 12—i.e., the MIME message—into the individual parts 26.*x* in their respective native data types, to transfer each part 26.*x* over the network 14 making use of any reduced fee rates that may be available for certain data types, and to re-assemble the data 12 from the parts 26.*x* at the receiving end. In the example shown in FIG. 1, the second part 26.2 is the converted second portion 24.2 of the MIME message, and the third part 26.3 is the converted third portion 24.3 of the MIME message. Depending on whether the first portion 24.1 of the original MIME message has a text or binary data format, the first part 26.1 may be either identical to, or a converted version of, the first portion 24.1.

In the presently described embodiment, the above basic idea is implemented as follows: The sender-side processor 18 performs the steps of splitting and converting the data 12 into the parts 26.*x*, and sending the parts 26.*x* to the network 14. The resultant data—i.e., the parts 26.*x*—is designated as processed data 12' in FIG. 1. In addition to the individual parts 26.*x*, the sender-side processor 18 further generates a split description 28 and transmits it over the network 14. The split description 28 contains all information about the structure of the original data 12 that is necessary to reconstruct the data 12 from the parts 26.*x*.

After the processed data 12' has been transmitted over the network 14, the receiver-side processor 20 processes the individually transmitted parts 26.*x* and the split description 28 in order to recover the original MIME encoded message as re-created data 12". In the presently described embodiment, the re-created data 12" is identical to the original data 12, and each portion 24.*x* of the re-created data 12" corresponds to one of the parts 26.*x* of the processed data 12'. The re-created data 12" is then forwarded to the receiver 16.

FIG. 2 shows a sample run in which the original data 12 having the form of a MIME message is transmitted over the network 14 to the mobile terminal 22. The process starts in step 30 when the sender-side processor 18 receives the original data 12. In step 32, the sender-side processor 18 generates the split description 28 and sends it over the network 14 to the mobile terminal 22. The kind of data transmission mechanism used for sending the split description 28 is not critical since the split description 28 will usually be rather short. For example, the split description 28 may be sent as a SIP MESSAGE message, or as an SMS, or as an email. The SIP MESSAGE mechanism, which has originally been developed for Instant Messaging applications, is defined in RFC 3428 available at http://www.ietf.org.

In the present embodiment, the sender-side processor 18 has the task of optimizing the overall costs of the data transmission through the network 14. The sender-side processor 18 therefore determines which parts 26.*x* defined by the data 12 are to be transmitted separately over the network 14 at a reduced billing rate. In the example shown in FIG. 2, the sender-side processor 18 determines that a first channel for text type data (incurring the standard rate) and a second channel for video/audio type data (billed at a reduced rate) are needed in order to transfer the data 12 as cost efficiently as possible. This information is sent to the receiver-side processor 20 as part of the split description 28. The receiver-side processor 20 then proceeds to open the required two channels for the data transmission, namely a first channel in step 34 and a second channel in step 36. In the present embodiment, this is done by opening a TCP/IP connection with an associated PDP context for each channel.

In the presently described embodiment, the opening of the required channels is initiated by the receiver-side processor 20, but it is apparent that there may also be embodiments in which the sender-side processor 18 is in charge of opening the channels.

In further alternative embodiments, the split description 28 contains only a description of the parts 26.*x* defined by the data 12, and it is the task of the receiver-side processor 20 to determine the number and type of the channels required for cost efficient data transmission.

In yet a further embodiment, the individual parts 26.*x* are sent over the network 14 as SIP MESSAGE messages. Each such message may contain, for example, one of the parts 26.*x* as its payload. The split description 28 may be sent as an additional SIP MESSAGE with the textual description of the MIME data structure as its payload. Alternatively, the information that is necessary for the mobile terminal 22 to reconstruct the original data 12 can also be transmitted in a proprietary header field of one or more of the SIP MESSAGE messages.

It is apparent that at least one of the sender-side processor 18 and the receiver-side processor 20 must have access to rules that define which kinds of channels are to be opened for which data types of the parts 26.*x*. These rules preferably represent the actual fee structure implemented in the network 14, but they may also be heuristic rules that have a sufficient likelihood of being correct for a variety of network operators. Information about the fee structure of the network 14 may also be transmitted from the sender-side processor 18 to the receiver-side processor 20 and vice versa so that the information is available at both end points of the data transfer. This makes it possible for the mobile terminal 22 to act both as a sender and a receiver, i.e., to implement the functions of both the sender-side processor 18 and the receiver-side processor 20.

Continuing the sample run of FIG. 2, the sender-side processor 18 now proceeds to convert the portions 24.*x* of the data 12 into the corresponding parts 26.*x* in their respective native data types. The sender-side processor 18 then sends each part 26.*x* via the associated channel to the mobile terminal 22. In other words, the first part 26.1 is sent via the first channel (step 38), and the second and third parts 26.2 and 26.3 are sent via the second channel (steps 40 and 42). TCP/IP is used as the protocol for the data transfer.

The data parts 26.*x* are transmitted via the channels in respective formats that incur the lowest possible fees. For example, the video and audio parts 26.2 and 26.3 are transmitted in their native (binary) data format via the second channel because the network 14 charges a reduced rate for multimedia data transmissions. Of course, in embodiments in which the network 14 offers a reduced fee rate for transmission of multimedia data even if it is text encoded, the original text encoded portions 24.*x* of the data 12 can be transmitted without any conversion into a binary data format. In this case, the sender-side processor 18 only needs to perform a splitting operation.

After all parts 26.*x* defined by the data 12 have been received at the mobile terminal 22, the receiver-side processor 20 produces the re-created data 12" in step 44. The receiver-side processor 20 converts the parts 26.*x* into the text encoded format of the MIME message, insofar as this conversion is necessary. Each converted part 26.*x* forms one portion 24.*x* of the resultant data 12". The receiver-side processor 20 further combines the converted parts 26.*x*, using the information contained in the split description 28 to re-create any headers and other MIME data structures. In the embodiment shown in FIG. 1 and FIG. 2, the re-created data 12" is identical to the original data 12. However, there may also be embodiments in which the re-created data 12" is slightly different from the original data 12. For example, the re-created data 12" may contain different MIME data structures such as a different boundary string.

There may also be embodiments in which no MIME formatted message is re-created at the mobile terminal 22, but the incoming parts 26.*x* are combined into a non-MIME format package, or are further processed individually. For example, the receiver-side processor 20 may output a ZIP archive that contains the parts 26.*x* in their binary data format as received from the network 14, or the mobile terminal 22 may contain an email program that is adapted to directly receive and process the incoming parts 26.*x* without the need for any receiver-side processor 20.

The present invention is also not limited to embodiments that expect the original data 12 to have a text based data format. In some embodiments, the sender 10 may produce a ZIP archive with the parts 26.*x*. The sender-side processor 18 will then just need to split the ZIP archive into its parts 26.*x* and determine the most suitable way of transmitting the individual parts 26.*x* over the network 14.

FIG. 3 shows another embodiment that also comprises a sender 10, a network 14, and a receiver 16 that is contained in a mobile terminal 22. The sender 10 produces original data 12, which is processed by a sender-side processor 18 to produce processed data 12'. The processed data 12' is transmitted in a cost efficient manner via the network 14 to the mobile terminal 22. A receiver-side processor 20 of the mobile terminal 22 converts the received data 12' to obtain re-created data 12", which is identical or substantially identical to the original data 12.

Again, the network 14 implements a charging policy in which the transmission of different types of data is charged at different rates. For example, the original data 12 may be text type data that would be charged at the standard-high-rate. The basic idea of the presently described embodiment is to convert at least a portion of the original data 12 into a data format and/or data type that guarantees the cheapest possible transmission tariffs. For example, if the operator of the network 14 has a charging policy in which the transmission of video data is billed at a reduced rate, then the sender-side processor 18 converts the original data 12—or at least a portion thereof—to a video data type format that will incur lower charges. This conversion is especially easy to implement if the new format is a binary format. This is the case in the present example since a multimedia transmission will usually allow any binary data.

In the sample execution sequence shown in FIG. 3, it is assumed that the original data 12 is a text based SMS message that is to be transmitted to the receiver 16. The sender-side processor 18 acts as a converting server and converts the SMS message into a data format that is compatible with the video data format accepted by the network 14, thus obtaining the processed data 12'. The sender-side processor 18 further initiates a transaction to transfer the processed data 12' (having the video data format) to the mobile terminal 22.

In various embodiments, the processed data 12' that is output by the sender-side processor 18 may include further administrative information and/or consistency check information and/or type disguising data. The administrative information assists the receiver-side processor 20 in decoding the message and recovering the original content as the re-created data 12". The consistency check information provides a safeguard to detect and/or correct undesired modifications of the processed data 12' during transmission over the network 14. The type disguising data is additional information required to overcome any data type detection mechanisms that may be present in the network 14. For example, the type disguising data may be data that establishes the correct syntactical format of the new (e.g., multimedia) data type. In other words, the type disguising data ensures that the network 14 cannot detect the type of the original data 12 from the transmitted data 12'.

Depending on the level of disguise that is required for overcoming any data type detection mechanisms of the network 14, it may be necessary to hide the administrative information and/or consistency check information in the processed data 12'. For example, hidden headers or a watermark may be used. This concerns, in particular, any information about the original data type that may be used by the receiver-side processor 20 to convert the received data 12' into the re-created data 12" in the correct format.

In some embodiments, the processed data 12' as transmitted over the network 14 does not contain any indications about the original data type. In such embodiments, the operation of the sender-side processor 18 and the receiver-side processor is governed by a common set of rules. For example, these rules may state that the receiver-side processor 20 will first try to decode the received data 12' to obtain text data. If this or other decoding schemes are not successful, then the receiver-side processor 20 will assume that the received data 12' has in fact been declared with its correct type for the transmission, such that no further conversion is necessary.

The receiver-side processor 20 generates the re-created data 12" according to the above guidelines and outputs it to the receiver 16 for further processing. In some embodiments, the re-created data 12" is identical to the original data 12. In other embodiments, there may be small differences between both pieces of data. For example, the encodings of the data 12 and 12" may be slightly different.

It is understood that the various features and modifications described above in connection with the embodiments shown in FIG. 1 and FIG. 2 are also applicable to the embodiments shown in FIG. 3. For example, any of the above data transfer mechanisms may be used in the system of FIG. 3. Furthermore, the sender-side processor 18 and the receiver-side processor 20 may be integrated into, or associated with, the sender 10 and/or the network 14 and/or the receiver 16 in any of the ways set forth above. The sender 10 and/or the sender-side processor 18 may also be part of a mobile terminal, in addition to or instead of the mobile terminal 22.

FIG. 3 shows an example in which the entire original data 12 is converted into the processed data 12'. However, the present invention also comprises embodiments in which the conversion only concerns a portion of the original data 12 from which the sender-side processor 18 generates a part of the processed data 12'. In this context, it is also possible to combine the embodiments shown in FIG. 1 and FIG. 2 on the one hand and FIG. 3 on the other hand. For example, the conversion method of FIG. 3 can be used to convert the first portion 24.1 of FIG. 1 into a converted data part having a video data format or another data format that can be transmitted more economically than the HTML data of the first part 26.1 of FIG. 1.

Summing up, the present invention in its various embodiments allows an optimization of data transfer costs. The cost savings may fully benefit the user, or there may be a third party service provider that operates the sender-side processor and/or the receiver-side processor 20, and charges for the cost advantage offered.

The particulars contained in the above description of sample embodiments should not be construed as limitations of the scope of the invention, but rather as exemplifications of some embodiments thereof. Many variations are possible and are immediately apparent to the person skilled in the arts. In particular, this concerns variations that comprise a combination of features of the individual embodiments disclosed in the present specification. Accordingly, the scope of the invention should be determined not by the embodiments illustrated, but by the appended claims and their legal equivalents.

The invention claimed is:

1. A method for sending data to a mobile telecommunication network for transmission over the network, the method comprising:
   providing original data that comprises multiple portions of data having at least two types;
   processing the original data, the processing comprising splitting and converting the original data into processed data and preparing a split description, the split description containing information about the structure of the original data, the processed data comprising at least a first portion of data having a first type and a converted portion of data obtained by converting at least one portion of the original data to a second type, wherein the network is configured to charge fees at a first rate for transmitting data of the first type and fees at a second rate for transmitting data of the second type, wherein the first rate is more expensive than the second rate; and
   sending the processed data and the split description to the network for transmission over the network such that at least the converted portion of the original data will be charged at the second rate;
   wherein said providing, processing, and sending are performed by a processor.

2. The method of claim 1, wherein the original data comprises at least a further portion of data having a different type than the first type, and wherein the converted portion of data is sent to the network over a first channel, and wherein the further portion of data or a converted version thereof is sent to the network over a second channel that is different from the first channel.

3. The method of claim 1, wherein the original data comprises at least a further portion of data that is also contained in the processed data.

4. The method of claim 1, wherein the original portion of data is essentially the whole original data, and the converted portion of data is essentially the whole processed data.

5. The method of claim 1, wherein the processed data comprises at least one of administrative information and consistency check information and type disguising data.

6. The method of claim 1, wherein the first type of data is one of text data and unspecified data and mixed data, and the second type of data is one of video data and audio data and multimedia data.

7. A non-transitory machine-readable medium that comprises a plurality of program instructions, the program instructions being adapted for causing the processor to perform the method of claim 1.

8. A method for re-creating original data from data received from a mobile telecommunication network, the received data having been transmitted over the network, the method comprising:
   receiving the data and a split description for the data from the network, the received data comprising at least a first portion of data having the first type and a second portion of data having the second type, and the split description containing information about the structure of the original data, wherein the network is configured to charge fees at a first rate for transmitting data of a first type and fees at a second rate for transmitting data of a second type, wherein the first rate is more expensive than the second rate; and
   processing the received data, the processing comprising converting the portions of received data and recombining the converted portions to re-create the original data according to the split description, the original data comprising multiple portions having at least two types wherein at least one portion of original data is re-created by converting the second portion of data to the first type;
   wherein said receiving and processing are performed by a processor.

9. The method of claim 8, wherein the received data comprises at least a further portion of data having a different type than the second type, and wherein the received portion of data is received from the network over a first channel, and wherein the further portion of data is received from the network over a second channel that is different from the first channel.

10. The method of claim 8, wherein the received data comprises at least a further portion of data that is also contained in the re-created data.

11. The method of claim 8, wherein the received portion of data is essentially the whole received data, and the converted portion of data is essentially the whole re-created data.

12. The method of claim 8, wherein the received data comprises at least one of administrative information and consistency check information and type disguising data.

13. The method of claim 8, wherein the first type of data is one of text data and unspecified data and mixed data, and the second type of data is one of video data and audio data and multimedia data.

14. A non-transitory machine-readable medium that comprises a plurality of program instructions, the program instructions being adapted for causing the processor to perform the method of claim 8.

15. A method for sending data to a mobile telecommunication network for transmission over the network, wherein the network is configured to charge fees at a first rate for transmitting data of a first type and fees at a second rate for transmitting data of a second type, wherein the first rate is more expensive than the second rate, the method comprising:
   providing original data having at least the first type;
   processing the original data, the processing comprising splitting and converting the original data into processed data and preparing a split description, the split description containing information about the structure of the original data, the processed data comprising at least a first portion of data having the first type and second portion of data converted to the second type; and
   sending the processed data and the split description to the network, wherein the first portion of data is sent via a first channel and the second portion of data is sent via a second channel such that the first portion of data will be charged at the first rate and the second portion of data will be charged at the second rate;
   wherein said providing, processing, and sending are performed by a processor.

16. The method of claim 15, wherein the second portion of data that is sent to the network is obtained by converting a portion of the original data from the first type to the second type.

17. The method of claim 15, wherein the original data is Multipurpose Internet Mail Extensions (MIME) encoded data.

18. The method of claim 15, wherein the first type of data is one of text data and unspecified data and mixed data, and the second type of data is one of video data and audio data and multimedia data.

19. A non-transitory machine-readable medium that comprises a plurality of program instructions, the program instructions being adapted for causing the processor to perform the method of claim 15.

20. A method for re-creating original data from data received from a mobile telecommunication network, the received data having been transmitted over the network, wherein the network is configured to charge fees at a first rate for transmitting data of a first type and fees at a second rate for transmitting data of a second type, wherein the first rate is more expensive than the second rate, the method comprising:

receiving a first portion of data having the first type via a first channel from the network, a second portion of data having the second type via a second channel from the network, and a split description containing information about the structure of the original data from the network, wherein the first portion of data is charged at the first rate and the second portion of data is charged at the second rate; and processing the received data, the processing comprising converting the portions of received data and recombining the converted portions to re-create the original data according to the split description, the original data comprising the first portion having the first type and at least one portion comprising the second portion of data converted from the second type;

wherein said receiving and processing are performed by a processor.

21. The method of claim 20, wherein the processing comprises converting the received second portion of data from the second type to the first type.

22. The method of claim 20, wherein the re-created data is Multipurpose Internet Mail Extensions (MIME) encoded data.

23. The method of claim 20, wherein the first type of data is one of text data and unspecified data and mixed data, and the second type of data is one of video data and audio data and multimedia data.

24. A non-transitory machine-readable medium that comprises a plurality of program instructions, the program instructions being adapted for causing the processor to perform the method of claim 20.

* * * * *